United States Patent [19]

Wormser

[11] Patent Number: 5,122,346
[45] Date of Patent: Jun. 16, 1992

[54] DISTRIBUTOR FOR MULTISTAGE FLUIDIZED BEDS

[76] Inventor: Alex Wormser, 24 High St., Marblehead, Mass. 01945

[21] Appl. No.: 521,579

[22] Filed: May 10, 1990

[51] Int. Cl.⁵ .............................. B01J 8/24; B01J 8/28; B01J 8/44
[52] U.S. Cl. .................. 422/142; 34/57 A; 422/143; 422/146; 422/311
[58] Field of Search ............ 422/143, 146, 311, 141, 422/142, 146; 34/57 A; 110/245, 263, 347; 122/40

[56] References Cited

U.S. PATENT DOCUMENTS

| | | | |
|---|---|---|---|
| 2,487,984 | 11/1949 | Rodman | 422/143 |
| 2,651,565 | 9/1953 | Bergman | 422/143 |
| 2,948,671 | 8/1960 | Packie et al. | 422/143 |
| 3,040,439 | 6/1962 | Frost | 422/143 |
| 3,298,793 | 1/1967 | Mallison et al. | 422/143 |
| 3,361,539 | 1/1968 | Pyzel | 422/143 |
| 3,419,253 | 12/1968 | Eckert | 422/311 |
| 3,462,246 | 8/1969 | Copeland | 422/143 |
| 3,653,843 | 4/1972 | Seelander | 422/143 |
| 4,213,938 | 7/1980 | Pyzel | 422/143 |
| 5,009,852 | 4/1991 | Kita et al. | 422/143 |

FOREIGN PATENT DOCUMENTS 2075360 11/1981 United Kingdom ............... 422/311

Primary Examiner—Peter Kratz
Attorney, Agent, or Firm—Testa, Hurwitz & Thibeault

[57] ABSTRACT

A mechanism for the prevention of distributor plate pluggage by dust-laden gases in multistage fluidized-beds is disclosed. Slanted tubes are used to control the flow of gases into a fluidized bed, where the angle between the slanted tube and the distributor plate is less than the angle of repose of the bed solids.

8 Claims, 6 Drawing Sheets

DISTRIBUTOR FOR MULTISTAGE FLUIDIZED BEDS

BACKGROUND OF THE INVENTION

Multistage fluidized beds may be used as calciners, for waste-heat recovery, and as coal-combustion boilers, among other applications. In multistage fluidized beds, gases flow in sequence through a first bed and then one or more additional beds. A fluidized bed is a vessel with a distributor plate through which gases flow, and has a granular material, such as sand or limestone, placed on the distributor plate.

If the gases flowing through the fluidized bed entrain sticky materials, such as coal melted ash, the perforations in the subsequent distributor plates may become plugged, requiring the fluidized bed to be shut down for clean out. If the need for cleanout becomes too frequent, the use of multiple stages becomes unfeasible. Multi-bed coal-fired fluidized bed combustors with conventional distributor designs typically can operate for about two months between cleanouts. A distributor must also be able to prevent weepage, or, the flow of bed solids through the distributor when the gasflow is turned off.

Distributors of various designs for distributing gasflow uniformly across a fluidized bed are known. In the drilled-plate design, numerous small holes are drilled in a horizontal plate. Since the holes in drilled-plate distributors are vertical, small holes (relative to the bed-solid particles) must be used to prevent weepage. The smaller the holes, however, the more susceptible the plate is to pluggage by sticky materials. A beehive-shaped buildup forms at the entrance of each hole, increasing the blockage until shutdown is required. Such buildups have been experienced at temperatures at which the material are normally non-sticky, as with coal ash upwards of 1000° F. below the ash fusion point. Even at such temperatures, buildups requiring shutdown have been experienced within minutes of the start of operation. The drilled-plate distributor may therefore be unsuitable for use with multistage fluidized beds using sticky materials.

Other distributor designs use bubblecaps to control the gasflow. Bubblecap distributors consist of arrays of vertical pipes mounted in holes in a horizontal plate. To form the bubblecaps, the pipes are capped at the top, and holes or orifices that are approximately horizontal are provided near the top of the pipe to control the gasflow. The use of bubblecaps avoids the spouting of gasflow through the bed, and prevents weepage. Some bubblecaps provide additional baffles or shields to increase the protection against weepage. Because they can use larger holes without incurring weepage, the hole size of bubblecap distributors can be half an order of magnitude larger than with drilled-plate designs, reducing the tendency to pluggage.

Buildups still occur in bubblecap distributors, but at a much lower rate than with drilled-plate designs. The buildups in bubblecap distributors, however, form within the bubblecaps themselves. These buildups typically are dense and impervious, and are found at the entrance to the orifices, where the gases change direction. They form by the impact of solids that can't turn as sharply as the gases, hitting the bubblecap instead of leaving at the hole. Impact causes the materials to be sticky under conditions where they are nonsticky at low velocities, e.g., at the bed surface and walls. No buildup occurs, however, at the entrance to the bubblecaps, i.e., at the pipe inlet. For impact-caused buildup to occur with an ash-laden fluidized bed, two factors must be present: high velocity, and a change of direction of the gas stream in the bubblecap.

SUMMARY OF THE INVENTION

A mechanism is disclosed which eliminates pluggage in multi-bed distributors by using a slanted tube, instead of a bubblecap or drilled hole, to form the passage in the distributor plate. The tube is angled sufficiently close to the horizontal to be below the bed material's angle of repose, thus preventing weepage. The mechanisms causing pluggage in both the drilled-plate distributor and bubblecap distributor are thus eliminated, and use of the present invention can increase the time between cleanouts by more than thirty-fold compared with a bubblecap distributor.

DETAILED DESCRIPTION OF THE INVENTION.

Figure 1:
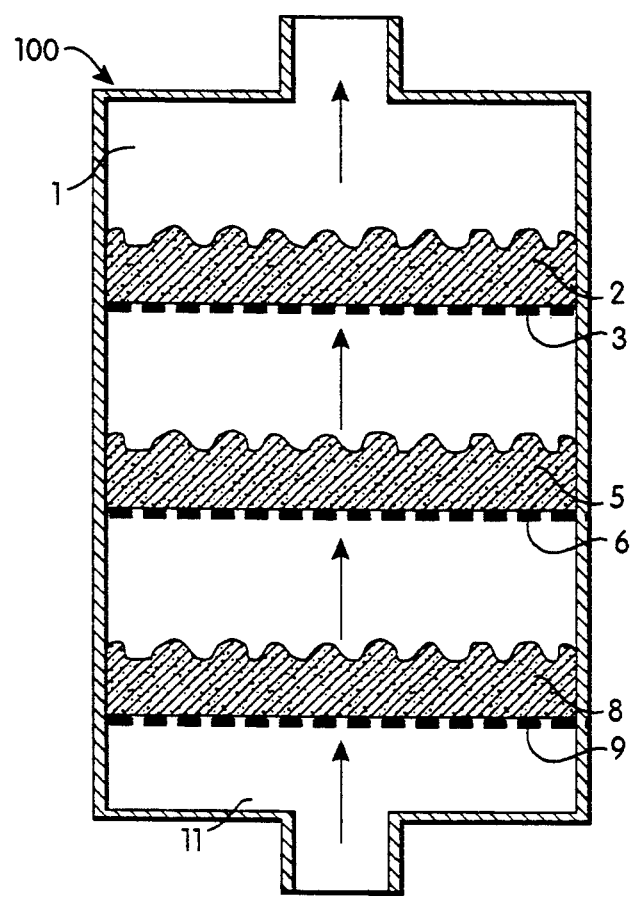
FIG. 1 is a cross-section schematic of a multistage fluidized bed.

FIG. 1 is a schematic cross-sectional diagram showing a three-stage fluidized bed 100 comprising a casing 1 with three distributors 3, 6, and 9. A layer of bed material 2, 5, and 8, is placed on the distributors 3, 6, and 9, respectively. Gases 11 enter the fluidized bed 100 below the first distributor 9, and flow sequentially through the distributors 9, 6, and 3, and bed material 8, 5 and 2. Dust, particulate matter, and/or condensate that is entrained from one fluidized bed thus passes through the subsequent distributors, and may cause pluggage in the subsequent distributors. (FIG. 1 does not show means for adding and removing solids, which depend on the application. Such means, as well as other variations to a fluidized bed combustor, including the number of beds, are known to those skilled in the art, and are not part of the present invention.)

Figure 2:
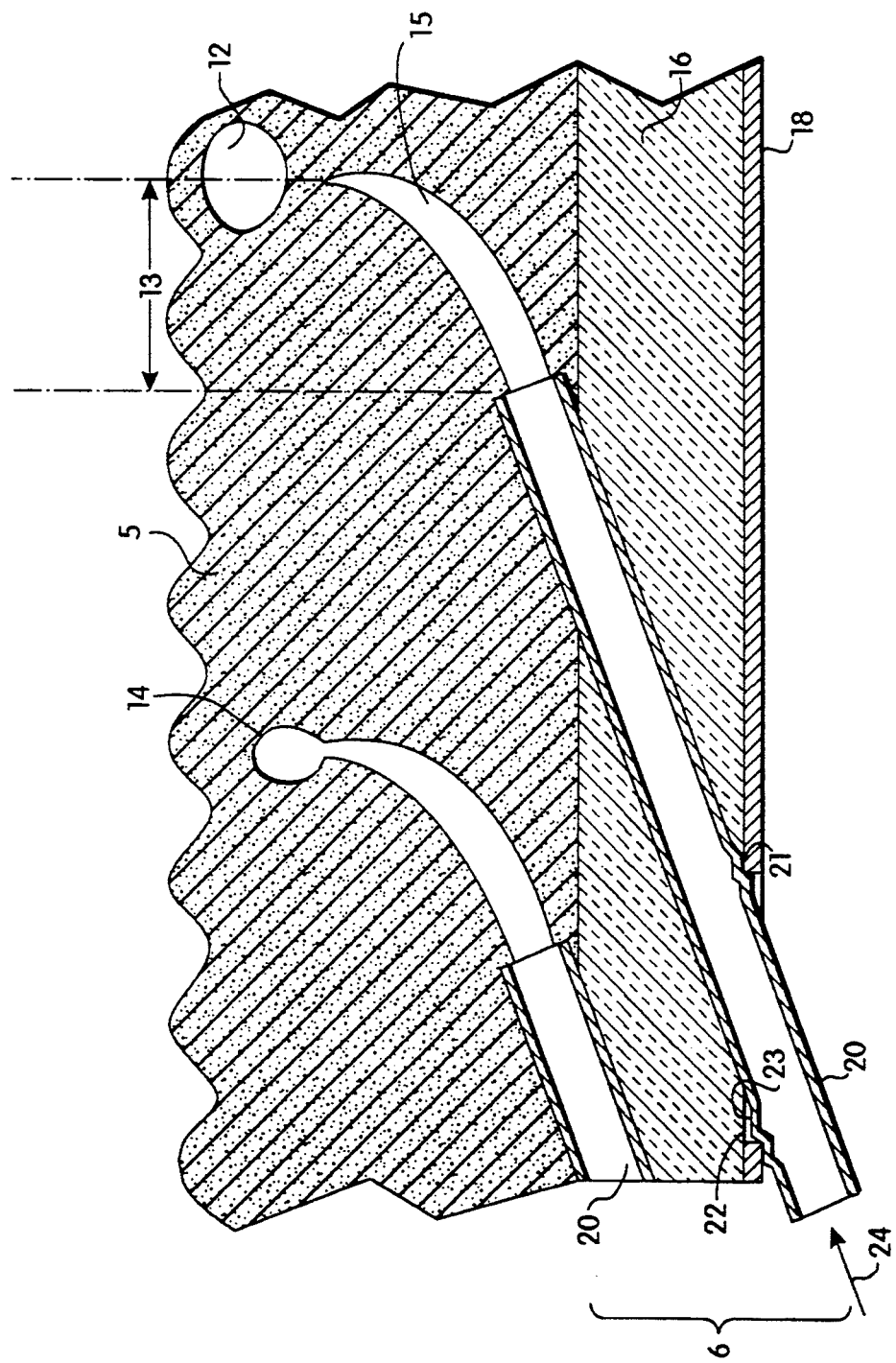
FIG. 2 is a side view of a portion of a fluidized bed using an embodiment of the present invention.

FIG. 2 depicts a portion of the base of a fluidized bed. Using the second bed of FIG. 1 as an example, the distributor 6 comprises an array of flow-tubes 20 mounted through oval slots 22 in distributor plate 18. A layer of rigid insulation 16 is located above distributor plate 18, and above that is the fluidized bed material 5. The insulation 16 protects distributor plate 18 from the heat of bed material 5. The flow-tubes 20 are mounted in distributor plate 18 by indentations 21 and 23, with additional support being provided by insulation 16. The flow-tubes 20 may be attached by other methods than that shown, such as welding, brazing, or the attachment of pins to the flow-tubes.

Gases 24 entering the flow-tube 20 go through the flow-tube 20 and form jet 15 in the fluidized bed. The jet 15 forms a bubble 12, which breaks off from the end of the jet and rises to the surface of the fluidized bed. When the bubble 12 breaks off, another bubble starts to form at the end of the jet, as is shown with bubble 14. The jet penetration distance 13 is the projected distance between the end of the flow-tube 20 and the locus of bubbles. The jet penetration distance depends on the velocity of the gases emerging from the flow-tube 20, and may be calculated from standard fluidized-bed text books.

The flow-tubes 20 are mounted at a slight angle from the horizontal, below the angle of repose of sand, limestone, and other common granular materials. The use of a 20-degree angle has been observed to prevent weepage in sand and limestone.

In one embodiment, used for a fluidized bed combustor of 20-mesh sand, with a depth of 4 to 20 inches, the flow-tube 20 has an outside diameter of one inch and a length of 12 inches, the thickness of plate 18 is one-quarter inch, and the insulation thickness is 3 inches. The flow-tube's length is that required to penetrate distributor plate 18 and insulation 16. In low-temperature applications, insulation 16 may be eliminated and flow-tubes 20 made correspondingly shorter. In other instances, however, insulation may be required at the lower surface of plate 18, requiring correspondingly longer flow-tubes 20 in order to penetrate this additional insulation. The insulation may be castable or bricks.

Figure 3:
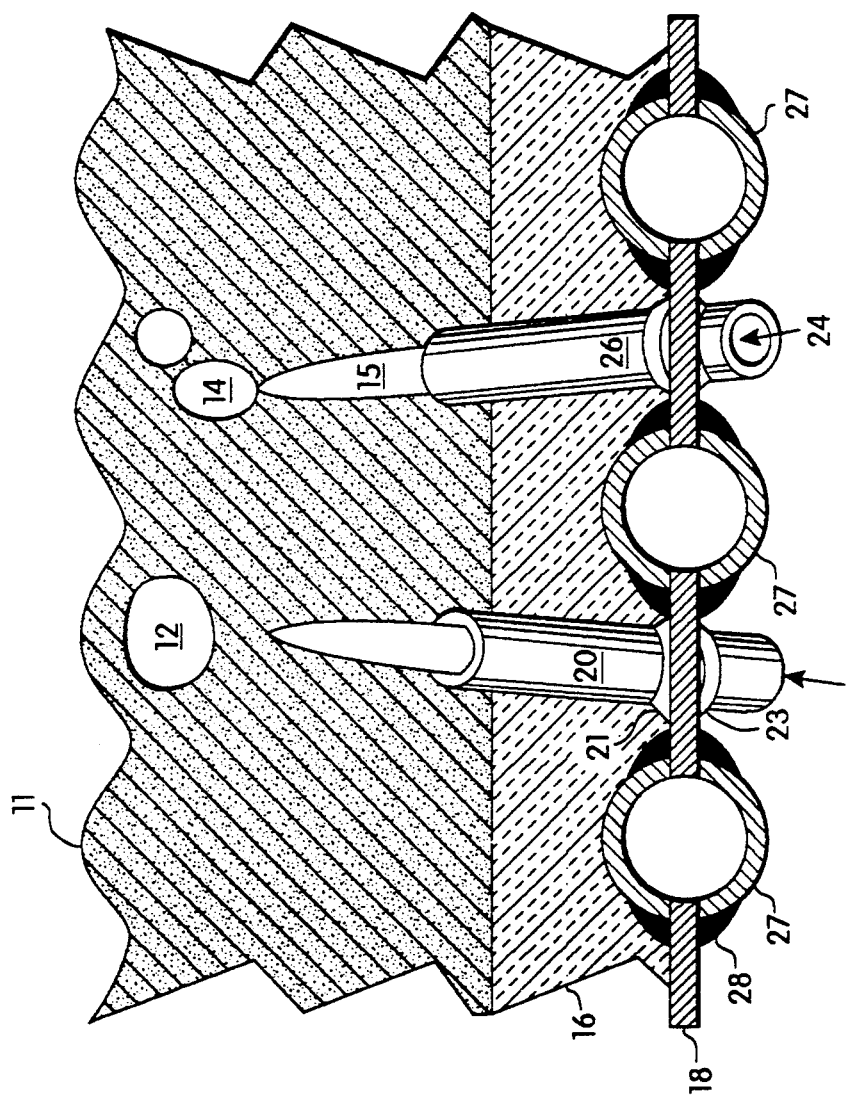
FIG. 3 is an end view of a portion of a fluidized bed using an embodiment of the present invention.

The distributor plate 18 is shown from the end-view of FIG. 3, to comprise a membrane between coolant tubes 27. Water and/or water-steam mixtures flow through the tubes 27 to provide the cooling needed for structural integrity in the high-temperature environment. The tubes 27 are attached to distributor plate 18 by welds 28. Such an assembly is referred to as a fin-tube. Other methods of construction may be used for the entire distributor, particularly in low temperature uncooled applications, such as by the replacement of the tubes by a plate with holes that are formed in place such as in a casting.

Figure 4:
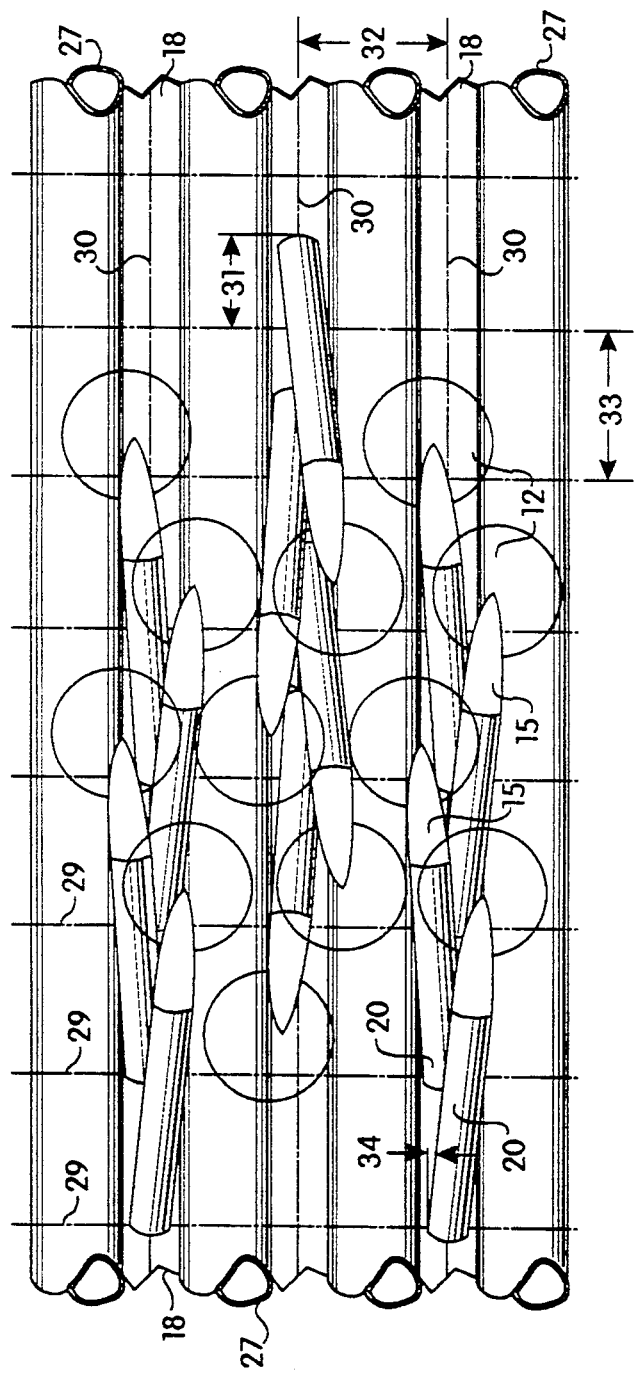
FIG. 4 is a plan view of a portion of a fluidized bed using an embodiment of the present invention.

From the plan view, FIG. 4, the flow-tubes 20 are shown to be located and angled so as to achieve uniform distribution to maximize the separation of bubbles 12. To achieve this, one row of flow-tubes 20 may be pointed generally to the right, but angled alternately from the centerline of the membrane. The tubes in the right-pointing rows penetrate the membranes at the centerlines 29.

The flow-tubes 20 in the adjacent membrane may be pointed generally to the left, and are also angled alternately from the membrane centerline. The left-hand flow-tubes penetrate their membrane at centerlines halfway between centerlines 29.

Though only a few flow-tubes 20 are shown in FIG. 4, the pattern is repeated across the distributor, with left-pointing flow-tubes and right-pointing flow-tubes mounted on alternate membranes, and flow-tubes extending in a uniform array until they reach the walls.

Adjacent rows of flow-tubes 20 may also be unidirectional, instead of opposed as shown in FIG. 4. This creates convection currents in the solids that may be used to convey tramp materials to one side of the bed for removal. The dimensions and spacing of the flow passages depends on the pressure drop requirements for the distributor, the bed depth, and other design parameters.

In one coal-fired fluidized-bed combustor embodiment, the longitudinal pitch 33 between flow-tubes 20 is 4 inches, while the lateral pitch 32 between membrane centerlines is 4.5 inches. The angle 34 between the flow-tubes and the membrane centerline is 6 degrees. The distance 31 between left-pointed flow-tubes and centerlines 29 is 2 inches.

Figure 5:
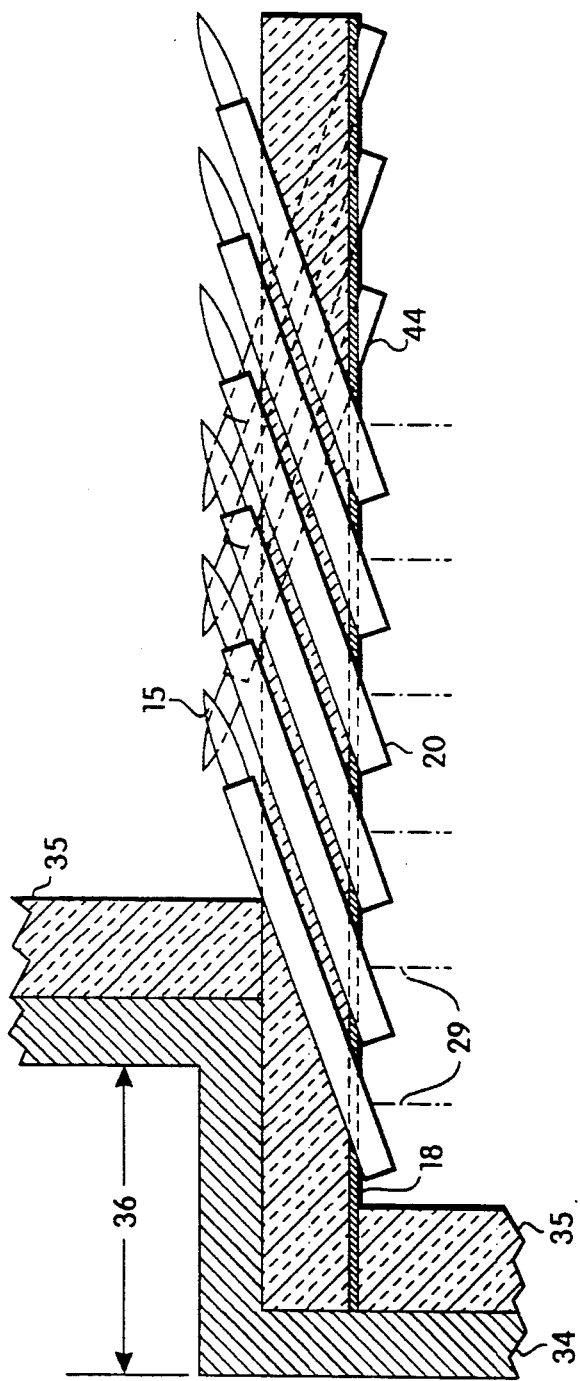
FIG. 5 is another side view of an embodiment of the present invention, as located near one wall of the fluidized bed vessel.

The configuration of the fluidized bed at the ends of the membranes is shown in FIG. 5. FIG. 5 shows an outer casing 34 lined with a layer of insulation 35. The wall is stepped inward at the distributor by distance 36. This eliminates non-fluidized islands that might otherwise occur above the right-facing flow-tubes 20 at the left-hand wall 35 of the fluidized bed. Non-fluidized islands can become enlarged, eventually causing shutdown.

A mirror-image of the construction of FIG. 5 is required at the opposite wall of the fluidized bed, to prevent the formation of non-fluidized islands over the left-facing flow-tubes 44. The stepped construction with offset 36 may be eliminated if the dead zones don't grow, as may be expected in non-combustion units. To maintain a constant bed area, as is desirable in some applications, more rows of flow-tubes are used in the distributor, to compensate for the loss of bed area caused by set-back 36.

Figure 6:
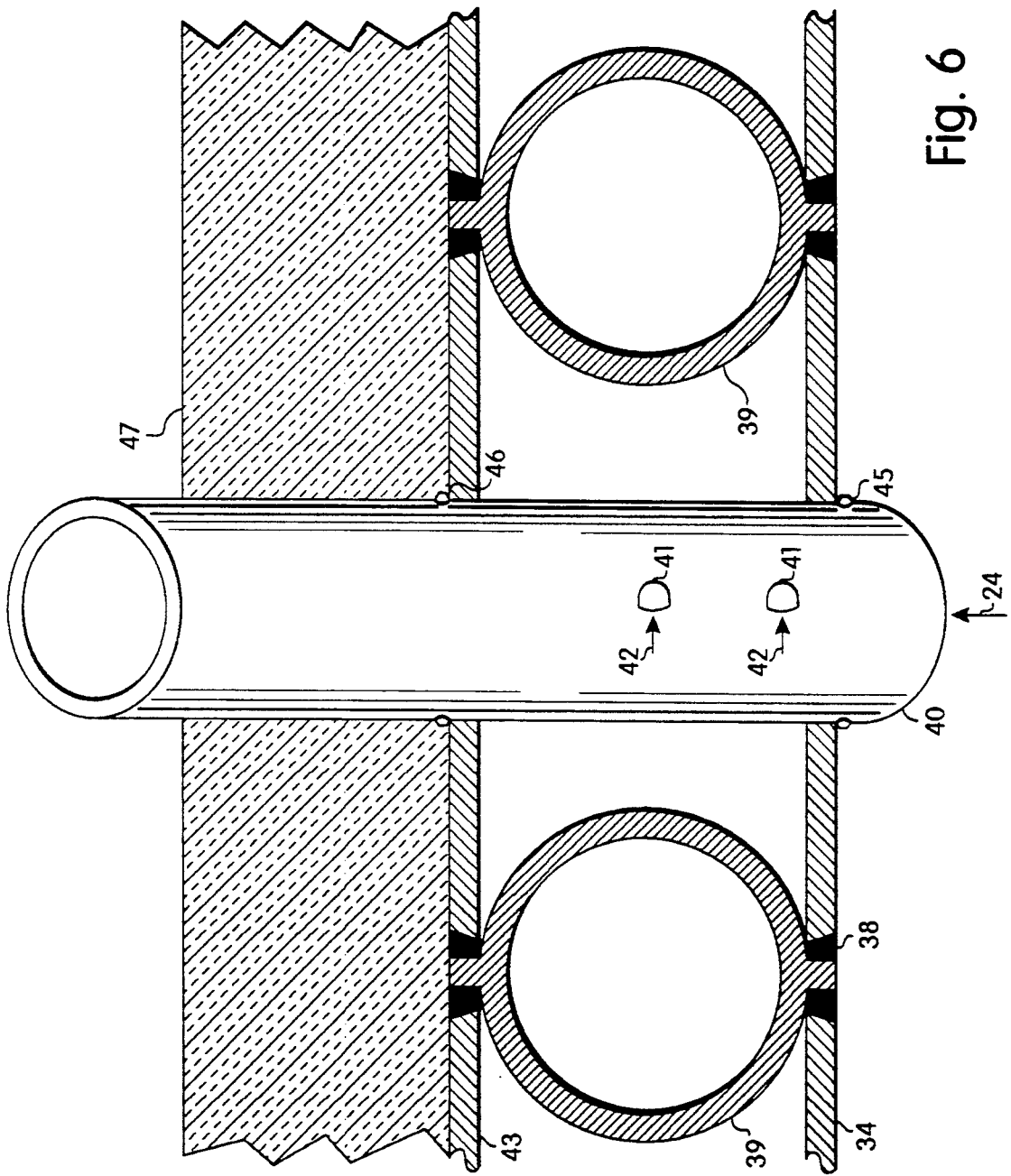
FIG. 6 is a schematic showing an alternative mounting of flow-tubes to a distributor plate.

FIG. 6 shows an alternative distributor design. Coolant tubes 39 are welded into membranes 37 and 43 at welds 38. Flow-tubes 40 are retained by indentations 45 and 46. Louvers 41 and 42 allow the addition of a fluid to the flow tubes. These may be used for the process, such as secondary combustion air, and also to further help prevent the fouling by highly sticky entrained substances.

Although only limited preferred embodiments of the invention have been illustrated and described, it is anticipated that various changes and modifications will be apparent to those skilled in the art, and that such changes may be made without departing from the scope of the invention as defined by the following claims.

What is claimed is:

1. A multibed fluidized bed system, comprising:
   a fluidized bed vessel having a casing surrounding a first distributor and a second distributor downstream from said first distributor; wherein said second distributor base has an upper surface, a lower surface and a plurality of means defining substantially straight elongated tubular passages mounted therethrough which have an input opening below said lower surface, an output opening above said upper surface, and which pass a gas from below said lower surface to above said upper surface of said distributor base;
   a first bed material placed on said first distributor and a second bed material placed on said second distributor; each of said bed materials having an angle of repose; and
   wherein the angle formed by said substantially straight elongated tubular passages and said upper surface is less than the angle of repose of said second bed material.

2. The fluidized bed system of claim 1, wherein said second distributor base comprises a fin-tube assembly.

3. The fluidized bed system of claim 1, wherein said second distributor base comprises two sheets of metal held together with rows of coolant tubes.

4. The fluidized bed system of claim 1, wherein said plurality of passages are arranged to form an array having a plurality of rows.

5. The fluidized tied system of claim 4, wherein the output openings of adjacent rows of passages are aimed in generally opposite directions.

6. The fluidized bed system of claim 4, wherein the output openings of adjacent rows of passages are aimed in the same general direction.

7. The fluidized bed system of claim 1, wherein the passages are positioned and oriented such that bubbles emerging from said passages are substantially equally spaced throughout said fluidized bed.

8. The fluidized bed system of claim 5, wherein the casing around said second fluidized bed distributor is stepped inwardly above said distributor base to enable the opposite aimed passages to form a more uniform array on the upper surface of said distributor base.

* * * * *